(12) United States Patent
Xue

(10) Patent No.: US 8,593,125 B1
(45) Date of Patent: Nov. 26, 2013

(54) BUCK DC-DC CONVERTER WITH DUAL FEEDBACK CONTROL

(71) Applicant: Micrel, Inc., San Jose, CA (US)

(72) Inventor: Dashun Xue, Austin, TX (US)

(73) Assignee: Micrel, Inc., San Jose, CA (US)

( * ) Notice: Subject to any disclaimer, the term of this patent is extended or adjusted under 35 U.S.C. 154(b) by 0 days.

(21) Appl. No.: 13/657,674

(22) Filed: Oct. 22, 2012

(51) Int. Cl.
*G05F 1/00* (2006.01)

(52) U.S. Cl.
USPC ............ 323/284; 323/280; 323/283; 323/285

(58) Field of Classification Search
USPC .......................... 323/273–275, 280, 282–285
See application file for complete search history.

(56) References Cited

U.S. PATENT DOCUMENTS

| | | | | |
|---|---|---|---|---|
| 6,304,066 | B1 * | 10/2001 | Wilcox et al. ................. | 323/282 |
| 6,628,109 | B2 | 9/2003 | Rincon-Mora | |
| 7,132,820 | B2 * | 11/2006 | Walters et al. ................ | 323/288 |
| 7,439,721 | B2 | 10/2008 | Weng et al. | |
| 8,446,135 | B2 * | 5/2013 | Chen et al. .................... | 323/271 |
| 2005/0231181 | A1 * | 10/2005 | Bernacchia et al. .......... | 323/274 |
| 2008/0067993 | A1 * | 3/2008 | Coleman ........................ | 323/282 |
| 2008/0088292 | A1 * | 4/2008 | Stoichita et al. .............. | 323/285 |
| 2009/0174383 | A1 * | 7/2009 | Tsui et al. ...................... | 323/282 |
| 2010/0066328 | A1 * | 3/2010 | Shimizu et al. ............... | 323/282 |
| 2011/0127980 | A1 * | 6/2011 | Chen et al. .................... | 323/282 |
| 2011/0215784 | A1 * | 9/2011 | Hoogzaad ...................... | 323/285 |

OTHER PUBLICATIONS

Yu et al., Design Oriented Model for Constant On-time V2 Control, IEEE, 2010, pp. 3115-3122.

* cited by examiner

*Primary Examiner* — Adolf Berhane
*Assistant Examiner* — Gary Nash
(74) *Attorney, Agent, or Firm* — Van Pelt, Yi & James LLP

(57) ABSTRACT

A buck switching regulator includes a feedback control circuit including a first gain circuit configured to generate a first feedback signal indicative of the regulated output voltage; a ripple generation circuit configured to generate a ripple signal using the switching output voltage and to inject the ripple signal to the first feedback signal; a second gain circuit configured to generate a second feedback signal indicative of the regulated output voltage; an operational transconductance amplifier (OTA) configured to generate an output signal having a magnitude indicative the difference between the second feedback signal and the first reference signal; and a comparator configured to generate a comparator output signal having an output level indicative of the difference between the output signal of the OTA and the first feedback signal. As thus configured, the buck switching regulator generates an output voltage with increased accuracy and fast transient response.

14 Claims, 3 Drawing Sheets

BUCK DC-DC CONVERTER WITH DUAL FEEDBACK CONTROL

BACKGROUND OF THE INVENTION

The invention relates to switching regulators and, in particular, to buck DC-DC converters with fast transient response and enhanced accuracy.

Switch mode power supplies or switching regulators, also referred to as DC to DC converters, are often used to convert an input supply voltage to a desired output voltage at a voltage level appropriate for the internal circuitry of an integrated circuit. For example, a 5 volts supply voltage provided to an integrated circuit may need to be reduced to 2.8 volts on the IC chip to operate the internal circuitry on the chip. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

The operation of the conventional buck switching regulator is well known and is generalized as follows. A conventional buck switching regulator includes a pair of power switches which are turned on and off to regulate an output voltage to be equal to a reference voltage. More specifically, the power switches are alternately turned on and off to generate a switching output voltage at a switching output node, also referred to as the switch node. The switch node is coupled to an LC filter circuit including an output inductor and an output capacitor to generate an output voltage having substantially constant magnitude. The output voltage can then be used to drive a load.

More specifically, the pair of power switches is often referred to as including a "high-side power switch" and a "low-side power switch." The high-side power switch is turned on to apply energy to the output inductor of the output filter circuit to allow the current through the inductor to build up. When the high-side power switch is turned off, the voltage across the inductor reverses and the current through the inductor reduces during this period. As a result, the inductor current ripples above and below the nominal output current. A relatively constant output voltage is maintained by the output capacitor. The low-side power switch is turned on and off for synchronous control operation.

FIG. 1 is a schematic diagram of a conventional switching regulator. Referring to FIG. 1, a switching regulator 1 includes a pair of power switches S1 and S2 configured to receive an input voltage $V_{IN}$ and are alternately turned on and off to generate a switching output voltage $V_{SW}$ at a switch node (SW) 22. The switching output voltage $V_{SW}$ is directly coupled to an LC filter circuit including an output inductor L1 and an output capacitor $C_{OUT}$ to generate a regulated output voltage $V_{OUT}$ at a node 26 having a substantially constant magnitude. The output voltage $V_{OUT}$ can then be used to drive a load 30 whereby switching regulator 1 provides the load current $I_{LOAD}$ to maintain the output voltage $V_{OUT}$ at a constant level.

Switching regulator 1 includes a feedback control circuit to regulate the energy transfer to the LC filter circuit to maintain the constant output voltage within the desired load limits of the circuit. More specifically, the feedback control circuit causes power switches S1 and S2 to turn on and off to regulate the output voltage $V_{OUT}$ to be equal to a reference voltage $V_{REF}$ or to a voltage value related to the reference voltage $V_{REF}$. In the present embodiment, a voltage divider including resistors R1 and R2 is used to divide down the output voltage $V_{OUT}$ which is then fed back to the switching regulator 1 as a feedback voltage $V_{FB}$ on a feedback node 28. The feedback voltage $V_{FB}$ is compared with the reference voltage $V_{REF}$ at an error comparator 12. The comparator output is coupled to a controller and gate drive circuit 14 to generate control voltages for the power switches based on a switching regulator control scheme. The control voltages are used to generate gate drive signals for the power switches S1 and S2. The gate drive signal for the high-side power switch S1 is coupled to a high-side driver circuit 18 while the gate drive signal for the low-side power switch S2 is coupled to a low-side driver circuit 20. Driver circuits 18, 20 convert the respective gate drive signals to gate drive voltages appropriate for turning on and off the respective power switches.

Buck switching regulators or "buck regulators" with fixed on-time control are preferred in the industry for some important advantages as good efficiency for light load in PFM (pulse frequency modulation) mode, easy synchronization with external signals, easy control of a relatively large off-time and a very small fixed on-time to regulate a high input voltage to a low output voltage. Fixed on-time (or constant on-time) regulators are one type of voltage regulators employing ripple-mode control where the output voltage is regulated based on the ripple component in the output signal. Because of the switching action at the power switches, all switch-mode regulators generate an output ripple current through the switched output inductor. This current ripple manifests itself as an output voltage ripple due, principally, to the equivalent series resistance (ESR) in the output capacitors placed in parallel with the load. The ESR of the output capacitor $C_{OUT}$ is denoted as a resistor $R_{ESR}$ in FIG. 1.

FIG. 2 is a voltage waveform illustrating the output voltage ripple on the feedback voltage $V_{FB}$ of a constant on-time voltage regulator. In operation, a constant on-time (or fixed on-time) regulator switches the output inductor high for a fixed On time (Ton) when the output ripple falls below a single reference point $V_{REF}$. At the end of the fixed on-time, even if the output ripple may still be below the single reference point, the output inductor is switched low for a minimum off-time before getting switched back high for the fixed on-time again. In the feedback control loop, the output voltage ripple on the feedback voltage $V_{FB}$ is regulated so that the valley of the voltage ripple essentially sits at the reference voltage level, as shown in FIG. 2. The output voltage ripple increases for the fixed On time (Ton) when the high-side power switch is turned on and the output voltage ripple decreases when the high-side power switch is turned off until the feedback voltage $V_{FB}$ reaches the reference voltage $V_{REF}$.

For voltage regulators using ripple-mode control, while the output ripple is useful in output voltage regulation, it is undesirable because the output ripple introduces an offset to the output voltage, reducing the output signal accuracy. In particular, the average DC voltage (the mid-point) of the ripple voltage signal should equal to the comparator reference voltage $V_{REF}$. However, as shown in FIG. 2, when the feedback voltage includes a ripple voltage component, the average DC voltage (line 36) of the feedback signal $V_{FB}$ is offset from the reference voltage $V_{REF}$ (line 34) due to various factors, such as the delay time to turn on the high-side switch. As a result, output voltage $V_{OUT}$ has a DC offset voltage component which affects the accuracy of the buck regulator.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a buck switching regulator implements a feedback control circuit with dual control loops to regulate the output voltage to a substantially constant level without voltage offset and with fast transient response. In some embodiments, the feedback control scheme in the buck switching regulator includes a slow control loop without or with very little output voltage ripple and a fast control loop with injected ripple components. The slow control loop regulates the output voltage to a reference level while the fast control loop controls the switching of the power switches. In this manner, the buck switching regulator generates an output voltage with increased accuracy and fast transient response.

Figure 1:
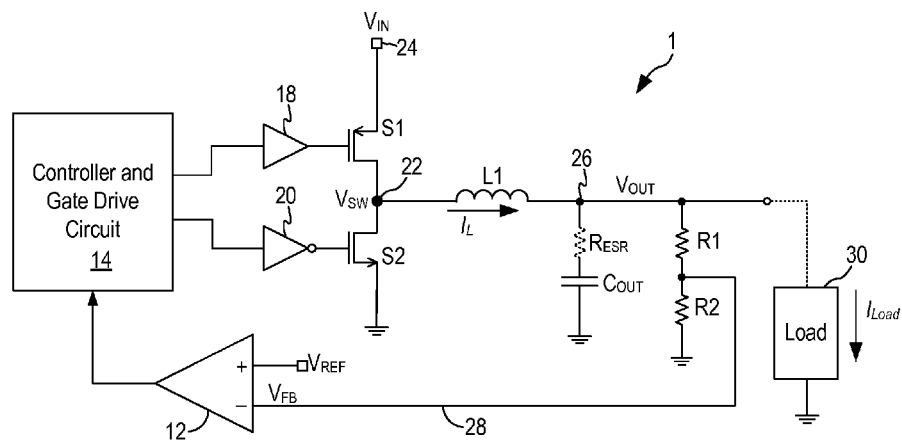
FIG. 1 is a schematic diagram of a conventional switching regulator.
Figure 2:
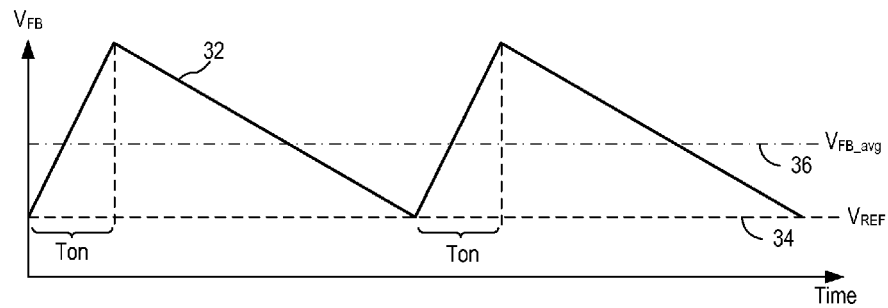
FIG. 2 is a voltage waveform illustrating the output voltage ripple on the feedback voltage $V_{FB}$ of a constant on-time voltage regulator.
Figure 3:
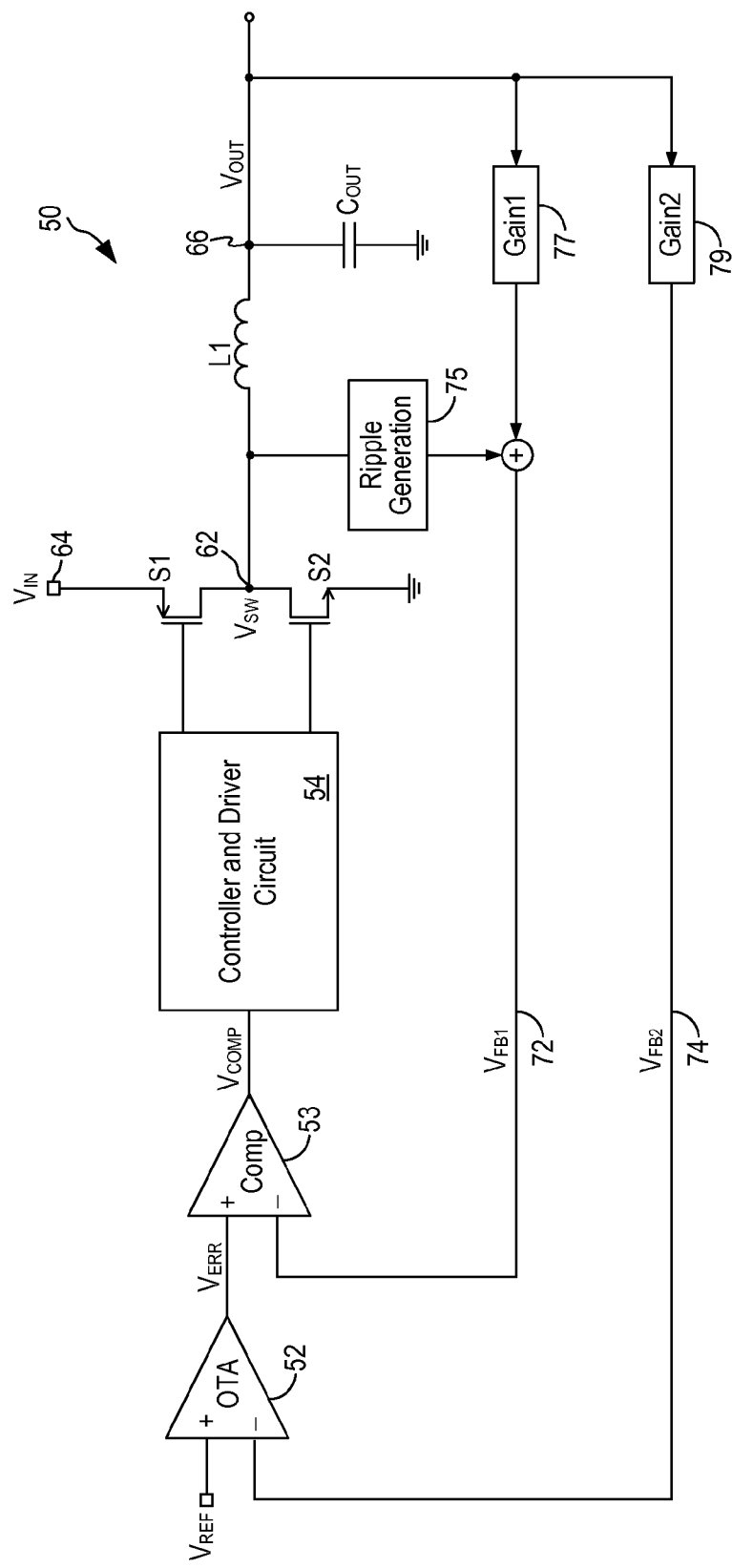
FIG. 3 is a schematic diagram illustrating an embodiment of a buck switching regulator implementing dual control loops.

FIG. 3 is a schematic diagram illustrating an embodiment of a buck switching regulator implementing dual control loops. Referring to FIG. 3, a switching regulator 50 includes a pair of power switches S1 and S2 connected in series between an input voltage $V_{IN}$ (node 64) and a ground potential. Power switches S1 and S2 are alternately turned on and off to generate a switching output voltage $V_{SW}$ at a switch node 62. The switching output voltage $V_{SW}$ is directly coupled to an LC filter circuit including an output inductor L1 and an output capacitor $C_{OUT}$ to generate a regulated output voltage $V_{OUT}$ at a node 66 having a substantially constant magnitude. The output voltage $V_{OUT}$ can then be used to drive a load whereby switching regulator 50 provides a load current $I_{LOAD}$ to maintain the output voltage $V_{OUT}$ at a constant level.

Switching regulator 50 includes a feedback control circuit to regulate the energy transfer to the LC filter circuit to maintain the constant output voltage within the desired load limits of the circuit. More specifically, the feedback control circuit causes power switches S1 and S2 to turn on and off to regulate the output voltage $V_{OUT}$ to be equal to a reference voltage $V_{REF}$ or to a voltage value related to the reference voltage $V_{REF}$. In embodiments of the present invention, the switching regulator 50 implements a constant on-time (or fixed on-time), variable off-time feedback control scheme. A controller and driver circuit 54 generates the gate drive voltages for controlling the power switches S1 and S2 based on the constant on-time control scheme. Under the constant on-time control scheme, the controller and driver circuit 54 turns on the high-side power switch S1 for a fixed On time (Ton) when the feedback signal $V_{FB1}$ falls below the reference voltage $V_{ERR}$. At the end of the fixed on-time, even if the feedback signal is still below the reference point, the high-side power switch S1 is turned off for a minimum off-time before getting switched back high for the fixed on-time again. Thus, the inductor current and the output ripple increase for the fixed On time (Ton) when the high-side power switch is turned on; meanwhile, the inductor current and the output ripple decreases when the high-side power switch S1 is turned off until the feedback signal $V_{FB1}$ reaches the reference point $V_{ERR}$.

To implement constant on-time control, the feedback control circuit relies on the ripple components in the feedback signal to regulate the output voltage. In some examples, an output voltage ripple is generated by using an output capacitor $C_{OUT}$ having a sufficiently large equivalent series resistance (ESR). However, capacitors with large ESR are generally more costly and also introduce ripples to the output voltage $V_{OUT}$ itself. In embodiments of the present invention, the output capacitor $C_{OUT}$ is implemented using a capacitor with low or zero ESR so that output voltage ripple and output voltage variation at the output voltage $V_{OUT}$ is minimized. Instead, a ripple generation circuit 75 is used to generate an internal ripple signal which is injected to the feedback control loop of the switching regulator 50. In the present embodiment, the ripple generation circuit 75 generates a ripple voltage signal using the switching output voltage $V_{SW}$ and the ripple voltage signal is injected only at a fast current control loop of the feedback control circuit, as will be described in more detail below.

In embodiments of the present invention, the feedback control circuit of the switching regulator 50 includes two feedback control loops—a first control loop being a fast control loop and a second control loop being a slower control loop. More specifically, the feedback control circuit includes a first gain circuit (Gain1) 77 and a second gain circuit (Gain2) 79 to generate two feedback voltage signals $V_{FB1}$ (node 72) and $V_{FB2}$ (node 74). The gain circuits 77 and 79 may have a gain of one or less than one. The gain values of the first and second gain circuits 77, 79 may be the same or they may be different. In some embodiments, the gain values for the first and second gain circuits 77, 79 may be 0.5 and 0.55, respectively. The ripple generation circuit 75 injects the ripple voltage signal to the first feedback voltage signal $V_{FB1}$ (node 72), illustrated by the use of an adder in FIG. 3. The use of an adder in FIG. 3 is symbolic only and in actual implementation, the ripple signal may be injected using other circuit configurations with or without an actual adder circuit.

As thus configured, only the first feedback voltage signal $V_{FB1}$ carries the injected ripple signal generated from the switching output voltage $V_{SW}$. The second feedback voltage signal $V_{FB2}$ is a DC signal and does not carry appreciable ripple signal components. The feedback control circuit includes an operational transconductance amplifier (OTA) 52 configured to receive the second feedback voltage signal $V_{FB2}$ and a reference voltage $V_{REF}$. The OTA 52 senses the difference between the reference voltage $V_{REF}$ and the second feedback voltage signal $V_{FB2}$ and generates an output signal $V_{ERR}$ which is coupled to a first input terminal of a comparator 53 as a first input signal. The comparator 53 receives the first feedback voltage signal $V_{FB1}$ carrying the ripple signal on a second input terminal as a second input signal. The comparator 53 compares the first feedback voltage signal $V_{FB1}$ with the error voltage signal $V_{ERR}$ generated by the OTA 52 to generate the comparator output signal $V_{COMP}$. The comparator output signal $V_{COMP}$ is coupled to the controller and driver circuit 54 to generate the driver signals for the power switches in accordance with a constant on-time control scheme. Importantly, hysteresis is not needed in the comparator 53.

It is instructive to note that OTA 52 generates the error voltage signal $V_{ERR}$ which is indicative of the voltage difference between the second feedback signal $V_{FB2}$ and the reference voltage $V_{REF}$. The error voltage signal $V_{ERR}$ is thus proportional to the magnitude of the voltage difference between the second feedback signal $V_{FB2}$ and the reference voltage $V_{REF}$. Meanwhile, the comparator 53 generates the comparator output signal $V_{COMP}$ being a logical signal having a logical high state and a logical low state. In the present embodiment, when the first feedback voltage signal $V_{FB1}$ is less than the error voltage signal $V_{ERR}$, the comparator output signal $V_{COMP}$ is asserted high to turn on the high-side power switch for the fixed on-time duration. When the first feedback voltage signal $V_{FB1}$ is greater than the error voltage signal $V_{ERR}$, the comparator output signal $V_{COMP}$ is asserted low. In this manner, the ripple signal of the first feedback voltage signal $V_{FB1}$ is regulated so that the valley of the ripple signal sits on the error voltage signal $V_{ERR}$.

The feedback control circuit thus formed includes two control loops. The first control loop is formed by the first feedback voltage signal $V_{FB1}$ and the comparator 53 and is a fast feedback loop responding to the inductor current. The first control loop includes output ripple signal components in the first feedback voltage signal $V_{FB1}$ which is coupled to the comparator 53 to be compared with the error voltage signal $V_{ERR}$ from the OTA 52 where the error voltage signal $V_{ERR}$ acts as the reference signal for the comparator 53. The second control loop is formed by the second feedback voltage signal $V_{FB2}$ and the OTA 52 and is an OTA feedback loop responding to the magnitude of the output voltage. The second control loop does not include any ripple signal components and the feedback signal $V_{FB2}$ is a DC signal. The OTA 52 senses the DC feedback signal $V_{FB2}$ and the reference voltage $V_{REF}$ to generate the error voltage signal $V_{ERR}$. Under normal operating conditions, signal $V_{ERR}$ is a DC signal, just like the reference signal, and does not vary at all. However, during load transients, the output voltage may change and the error signal $V_{ERR}$ responds to the changes in the output voltage $V_{OUT}$ and the DC level of the error signal $V_{ERR}$ will vary from the normal level. After the load transient event, when the output voltage $V_{OUT}$ returns to the regulated level, the error signal $V_{ERR}$ will return to its normal DC level. The comparator 53 in the first control loop compares the first feedback signal $V_{FB1}$ with the signal $V_{ERR}$ as the comparator reference signal.

The buck switching regulator 50 as thus configured provides many advantages. First, because the output voltage $V_{OUT}$ is regulated based on the second feedback voltage signal $V_{FB2}$ which has no ripple signal components, the output voltage $V_{OUT}$ does not contain any offset error. The accuracy of the output voltage $V_{OUT}$ is greatly improved.

Second, the OTA 52 is used to adaptively generate another reference signal for the comparator and the feedback signal $V_{FB1}$ carrying the ripple signal is used to trigger the comparator 53. By using a moving or varying signal at the comparator 53 as the "reference" signal for comparison with the ripple-injected feedback signal $V_{FB1}$, the feedback control circuit can achieve faster load transient response. In particular, when a large load transient is presented, the output voltage $V_{OUT}$ may drop a little but the control loop is able to respond very quickly to turn on the high-side power switch to regulate the output voltage back to the desired voltage level. More specifically, in the present embodiment, when the output voltage $V_{OUT}$ decreases due to load transient, the second feedback voltage signal $V_{FB2}$ decreases accordingly. The OTA 53 will generates an increased error voltage signal $V_{ERR}$ which will in turn increases the comparison level at the positive input terminal of the comparator 53. When the comparison level of the comparator 53 is increased, the ripple signal component on the first feedback signal $V_{FB1}$ will trigger the comparator output signal $V_{COMP}$ faster so that the high-side power switch S1 is turned on sooner. In this manner, the switching regulator 50 responds to changing load transient faster as compared to conventional switching regulators using a fixed reference voltage at the comparator.

Figure 4:
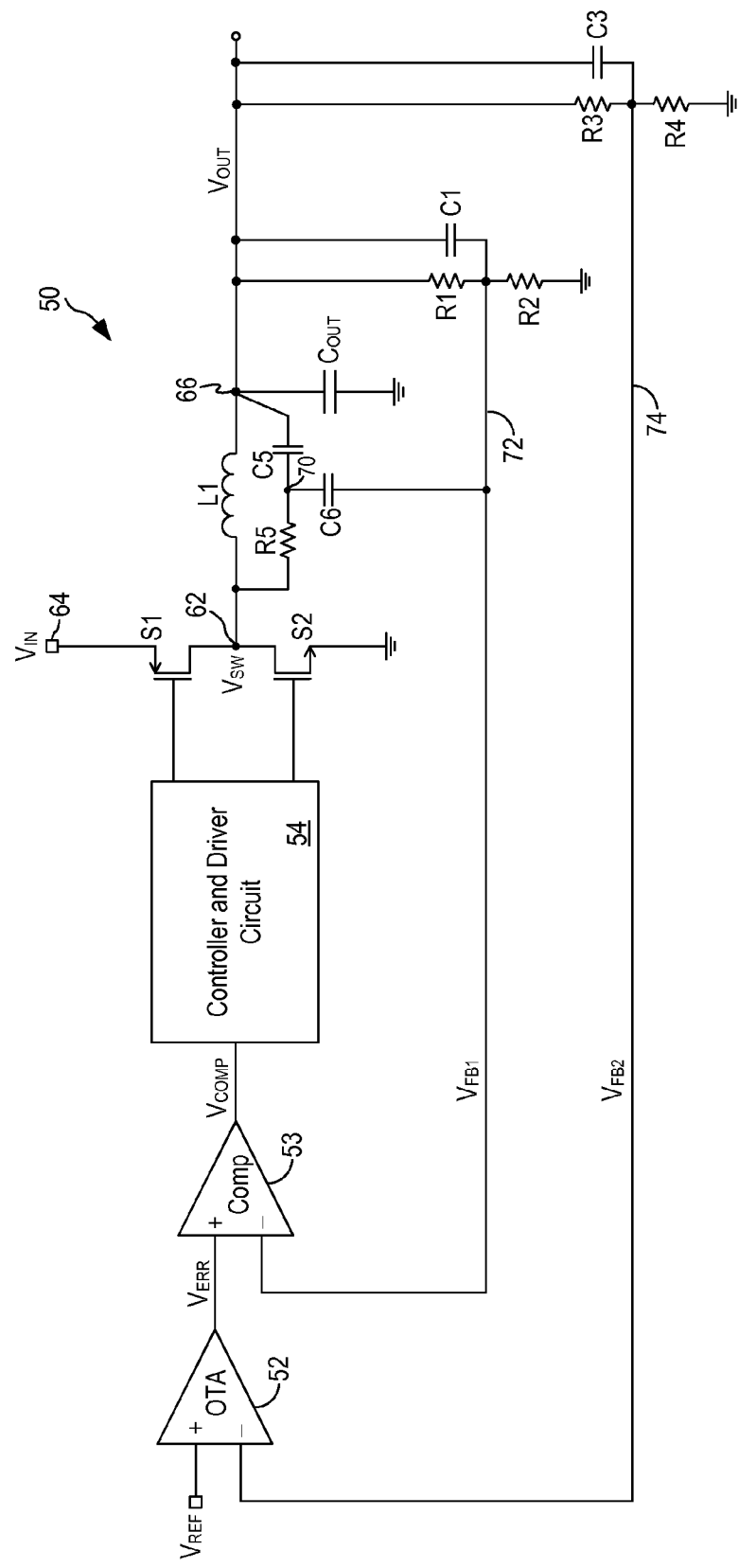
FIG. 4 is a schematic diagram illustrating an alternate embodiment of a buck switching regulator implementing dual control loops.

FIG. 4 is a schematic diagram illustrating an alternate embodiment of a buck switching regulator implementing dual control loops. More specifically, FIG. 4 illustrates an exemplary implementation of the ripple generation circuit and the gain circuits in the switching regulator 50 of FIG. 3. Referring to FIG. 4, in the present embodiment, the ripple injection circuit is implemented using a resistor R5 and a capacitor C5 connected in series across the inductor L1, that is between nodes 62 and 66. A capacitor C6 connects to the common node 70 and the first feedback voltage signal $V_{FB1}$ (node 72). The resistor R5, capacitors C5 and C6 operate to inject a ripple signal into the first feedback voltage node.

In the present embodiment, the first and second gain circuits are implemented as voltage dividers. More specifically, the first gain circuit is formed by resistors R1 and R2 connected in series between the output voltage node 66 and the ground potential. The common node 72 between resistors R1 and R2 is the first feedback signal $V_{FB1}$ which includes the DC voltage component generated from the output voltage $V_{OUT}$ and the injected ripple signal. A capacitor C1 is connected in parallel with resistor R1 to filter and stabilize the feedback voltage. Capacitor C1 is optional and may be omitted in other embodiments.

The second gain circuit is formed by resistors R3 and R4 connected in series between the output voltage node 66 and the ground potential. The common node 74 between resistors R3 and R4 is the second feedback signal $V_{FB2}$ which includes DC voltage component only. A capacitor C3 is connected in parallel with resistor R3 to filter and stabilize the feedback voltage. Capacitor C3 is optional and may be omitted in other embodiments. The voltage divider ratio for the first gain circuit and the voltage divider ratio for the second gain circuit can be the same or they can be different. Thus, the resistance values for resistors R1 and R2 and resistors R3 and R4 can be the same or they can be different.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A buck switching regulator being configured to receiving an input voltage and to generate a regulated output voltage, the buck switching regulator controlling a high-side switch and a low-side switch based on a feedback control scheme to drive a switch output node for generating a switching output voltage, the switch output node being coupled to an LC filter to generate the regulated output voltage having a substantially constant magnitude on an output node, the buck switching regulator including a feedback control circuit comprising:
    a first gain circuit configured to generate a first feedback signal indicative of the regulated output voltage;
    a ripple generation circuit configured to generate a ripple signal using the switching output voltage and to inject the ripple signal to the first feedback signal;
    a second gain circuit configured to generate a second feedback signal indicative of the regulated output voltage;
    an operational transconductance amplifier (OTA) configured to receive the second feedback signal and a first reference signal and to generate an output signal having a magnitude indicative the difference between the second feedback signal and the first reference signal; and
    a comparator configured to receive the output signal of the OTA and the first feedback signal and to generate a comparator output signal having an output level indicative of the difference between the output signal of the OTA and the first feedback signal,
    wherein the first gain circuit comprises a voltage divider having a first divider ratio and the second gain circuit comprises a voltage divider having a second divider ratio, the first divider ratio being the same as or different from the second divider ratio.

2. The buck switching regulator of claim 1, wherein the output signal of the OTA is a slowly varying signal, the feedback control circuit regulating valleys of the ripple signal to be at or above the output signal of the OTA.

3. The buck switching regulator of claim 1, wherein the second feedback signal is a DC signal and the output signal of the OTA is a slowly varying DC signal.

4. The buck switching regulator of claim 1, wherein the first feedback signal has the same magnitude or a different magnitude than the second feedback signal.

5. The buck switching regulator of claim 1, further comprising:
    a controller and driver circuit configured to drive the high-side switch and the low-side switch in response to the comparator output signal, the comparator output signal being asserted to turn on the high-side switch.

6. The buck switching regulator of claim 5, wherein the comparator output signal is asserted when the first feedback signal is less than the output signal of the OTA, the output signal of the OTA being a slowly varying signal.

7. The buck switching regulator of claim 5, wherein the controller and driver circuit implements a constant on-time feedback control scheme.

8. A method in buck switching regulator receiving an input voltage and controlling a high-side switch and a low-side switch using a feedback control scheme to drive a switch output node for generating a switching output voltage, the switch output node being coupled to an LC filter circuit to generate a regulated output voltage having a substantially constant magnitude on an output node, the method comprising:
    generating a first feedback signal indicative of the regulated output voltage;
    generating a ripple signal using the switching output voltage;
    injecting the ripple signal to the first feedback signal;
    generating a second feedback signal indicative of the regulated output voltage;
    generating using an operational transconductance amplifier (OTA) an output signal having a magnitude indicative the difference between the second feedback signal and a first reference signal; and
    generating using a comparator a comparator output signal having an output level indicative of the difference between the output signal of the OTA and the first feedback signal,
    wherein generating a first feedback signal indicative of the regulated output voltage comprises dividing the regulated output voltage by a first divider ratio to generate the first feedback signal; and generating a second feedback signal indicative of the regulated output voltage comprises dividing the regulated output voltage by a second divider ratio to generate the second feedback signal, the first divider ratio being the same as or different from the second divider ratio.

9. The method of claim 8, wherein the output signal of the OTA comprises a slowly varying signal and the method further comprises:
    regulating the valleys of the ripple signal to be at or above the output signal of the OTA.

10. The method of claim 8, wherein the second feedback signal is a DC signal and the output signal of the OTA is a slowly varying DC signal.

11. The method of claim 8, wherein the first feedback signal has the same magnitude or a different magnitude than the second feedback signal.

12. The method of claim 8, further comprising:
    driving the high-side switch and the low-side switch in response to the comparator output signal, the comparator output signal being asserted to turn on the high-side switch.

13. The method of claim 12, wherein generating using a comparator a comparator output signal having an output level indicative of the difference between the output signal of the OTA and the first feedback signal comprises:
    asserting the comparator output signal when the first feedback signal is less than the output signal of the OTA, the output signal of the OTA being a slowly varying signal.

14. The method of claim 12, wherein driving the high-side switch and the low-side switch in response to the comparator output signal comprises:
    driving the high-side switch and the low-side switch in response to the comparator output signal under a constant on-time feedback control scheme.

* * * * *